United States Patent
Ko et al.

(10) Patent No.: US 6,356,585 B1
(45) Date of Patent: Mar. 12, 2002

(54) POWER CUTBACK IN SPLITTERLESS ADSL SYSTEMS

(75) Inventors: Kenneth D. Ko, Clearwater; Jamal Haque, Tampa, both of FL (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/162,845

(22) Filed: Sep. 29, 1998

(51) Int. Cl.[7] .............................. H04B 1/38; H04L 5/16
(52) U.S. Cl. ...................... 375/222; 375/219; 375/220; 370/485
(58) Field of Search ................................. 375/222, 220, 375/221, 219; 370/485, 494; 379/92.03, 92.04, 93.01; 455/399, 522

(56) References Cited

U.S. PATENT DOCUMENTS 6,101,216 A * 8/2000 Henderson et al. ......... 375/222
6,151,335 A * 11/2000 Ko et al. ..................... 370/487
6,212,227 B1 * 4/2001 Ko et al. ..................... 375/222
6,236,714 B1 * 5/2001 Zheng et al. .................. 379/6
6,263,077 B1 * 7/2001 Zuranski et al. ............ 379/410

* cited by examiner

Primary Examiner—Mohammad H. Ghayour
(74) Attorney, Agent, or Firm—Foley & lardner

(57) ABSTRACT

A splitterless digital subscriber line modem adapted to be coupled to a subscriber line including a sending end and a receiving end, the modem being capable of simultaneous access to the subscriber line with other telephone equipment operating in a frequency band below four kilohertz is disclosed herein. The modem includes a data terminal and a control circuit. The data terminal couples the modem to the subscriber line. The control circuit is coupled to the data terminal and receives and transmits signals to and from the data terminal. The control circuit utilizes line coding techniques to measure signal and noise at the receiving end and adjusts amplitude of the signal in response to the signal and the noise whereby power of the signal is optimized.

20 Claims, 4 Drawing Sheets

POWER CUTBACK IN SPLITTERLESS ADSL SYSTEMS

FIELD OF THE INVENTION

The present invention relates generally to communication systems. More particularly, the present system relates to a digital subscriber line modem.

BACKGROUND OF THE INVENTION

Explosive growth of the internet and the worldwide web drives increasing demands for faster communication data rates. In the corporate world, dedicated high-speed links (perhaps T1/E1 frame relays or OC1 ATM systems) from the company to an internet access provider satisfy current needs for highspeed access or data rates. Corporate users gain access to an internet router using a local area network (LAN). The router then connects to a high-speed link (e.g., T1/E1 lines). Unfortunately, residential users of the internet do not often have a high-speed link and must rely on standard analog or plain old telephone service (POTS) lines.

The increasing availability of information, data programs, entertainment, and other computer applications on the worldwide web and the internet strengthens the demand for high-speed access to the home. For example, designers of web technology constantly develop new ways to provide sensory experiences, including audio and video, to users of the web. Higher-speed modems will be required so the residential user can fully interact with future web and communication technologies.

Although designers of modems are continuously attempting to increase data rates, analog or POTS line modems can presently only reach data rates of up to 56 kilobits per second (Kbps). These conventional analog modems transmit and receive information on POTS subscriber lines through the public switched telephone network. The internet access provider is also coupled to the switched telephone network and transmits and receives information through it to the subscriber line.

Some residential users utilize integrated services digital network (ISDN) equipment and subscriptions to obtain up to 128 Kbps access or data rates the use of 2 B channels. ISDN equipment and subscriptions can, however, be expensive and require a dedicated subscriber line. Thus far, neither ISDN modems nor analog modems are capable of providing 256 Kbps or higher access between the home and the internet. Over one megabit per second (Mbps) data rates with analog modems or ISDN equipment do not seem feasible at this time.

A variety of communication technologies are competing to provide high-speed access to the home. For example, asymmetric digital subscriber lines (ADSL), cable modems, satellite broadcast, wireless LANs, and direct fiber connections to the home have all been suggested. Of these technologies, ADSL can utilize the POTS subscriber line (the wire currently being utilized for POTS) between the home user (the residence) and the telephone company (the central office).

ADSL networks and protocols were developed in the early 1990's with the purpose of allowing telephone companies to provide video-on-demand service over the same wires which were being used to provide POTS. ADSL technologies include discrete multitone (DMT), carrier less amplitude and phase modulation (CAP), and other technologies. Although the video-on-demand market has been less than originally expected, telephone companies have recognized the potential application of ADSL technology for internet access and have begun limited offerings.

ADSL technology allows telephone companies to offer high-speed internet access. ADSL also permits telephone companies to remove internet traffic from the telephone switch network. Currently, telephone companies cannot significantly profit from internet traffic in the telephone switch network due to regulatory considerations. In contrast, ADSL allows the telephone company to charge a separate access fee for data services. The separate fee is not as restricted by regulatory considerations.

With reference to FIG. 1, a conventional asymmetric ADSL (ADSL) system 10 includes a copper twisted pair analog subscriber line 12, an ADSL modem 14, an ADSL modem 16, a band splitter 18, and a band splitter 20. Line 12 is a POTS local loop or wire connecting a central office 32 of the telephone company and a user's residence 22.

ADSL modem 14 is located in user's residence 22 and provides data to and from subscriber line 12. The data can be provided from line 12 through modem 14 to various equipment (not shown) coupled to modem 14. Equipment, such as, computers, network devices, servers, or other devices, can be attached to modem 14. Modem 14 communicates with a data network (not shown) coupled to modem 16 across line 12. ADSL modem 16 receives and transmits signals to and from line 12 to the data network, The data network can be coupled to other networks (not shown), including the internet.

At least one analog telephone 26, located in residence 22, can be coupled to subscriber line 12 through splitter 20 for communications across line 12 with telephone switch network 28. Telephone 26 and telephone switch network 28 (e.g., public-switched telephone (PST) network) are conventional systems well-known in the art. Alternatively, other analog equipment, such as, facsimile machines, POTS modems, answering machines, and other telephonic equipment, can be coupled to line 12 through splitter 20.

System 10 requires that band splitter 18 and band splitter 20 be utilized to separate higher frequency ADSL signals and lower frequency POTS signals. For example, when the user makes a call from residence 22 on telephone 26, lower frequency signals (under 4 kilohertz (kHz)) are provided through band splitter 20 to subscriber line 12 and through band splitter 18 to telephone switch network 28. Band splitter 18 prevents the lower frequency POTS signals from reaching ADSL modem 16. Similarly, band splitter 20 prevents any of the POTS signals from reaching modem 14.

ADSL modem 16 and ADSL modem 14 communicate higher frequency ADSL signals across subscriber line 12. The higher frequency ADSL signals are prevented from reaching telephone 26 and telephone switch network 28 by band splitters 20 and 18, respectively. Splitters 18 and 20 can be passive analog filters or other devices which separate lower frequency POTS signals (below 4 kHz) from higher frequency ADSL signals (above 25 kHz).

The separation of the POTS signals and ADSL signals by splitters 18 and 20 is necessary to preserve POTS voice and data traffic and ADSL data traffic. More particularly, splitters 18 and 20 can eliminate various effects associated with POTS equipment which may affect the transmission of ADSL signals on subscriber line 12. For example, the impedance of subscriber line 12 can vary greatly as at least one telephone 26 is placed on-hook or off-hook. Additionally, the changes in impedance of subscriber line 12 can change the ADSL channel characteristics associated with subscriber line 12. These changes in characteristics can be particularly destructive at the higher frequencies associated with ADSL signals (e.g., from 30 kHz to 1 megahertz (MHz) or more).

Additionally, splitters 18 and 20 isolate subscriber line wiring within residence 22. The impedance of such wiring is difficult to predict. Further still, the POTS equipment, such as, telephone 26, provides a source of noise and nonlinear distortion. Noise can be caused by POTS voice traffic (e.g., shouting, loud laughter, etc.) and by POTS protocol, such as, the ringing signal. The nonlinear distortion is due to the nonlinear devices included in conventional telephones. For example, transistor and diode circuits in telephone 26 can add nonlinear distortion and cause hard clipping of ADSL signals. Telephone 26 can further generate harmonics which can reach the frequency ranges associated with the ADSL signals. The nonlinear components can also demodulate ADSL signals to cause a hiss in the audio range which affects the POTS.

Conventional ADSL technology has several significant drawbacks. First, the costs associated with ADSL services can be quite large. Telephone companies incur costs related to central office equipment (ADSL modems and ADSL network equipment) and installation costs associated with the ADSL modems and network equipment. Residential users incur subscriber equipment costs (ADSL modems) and installation costs.

Installation costs are particularly expensive for the residential user because trained service personnel must travel to residence 22 to install band splitter 20 (FIG. 1). Although band splitter 18 must be installed at the central office, this cost is somewhat less because service personnel can install band splitter 18 within central office 32. Also, at office 32, splitter 18 can be included in ADSL modem 16. However, in residence 22, splitter 20 must be provided at the end of subscriber line 12.

Additionally, ADSL equipment for the residence, such as, modem 14, is expensive because the most complex component of modem 14 (e.g., the receiver) is located at residence 22 since high-speed transmissions are generally received within residence 22, and lower-speed transmissions are received by central office 32. In most internet applications, larger amounts of data are requested by the residential user rather than by the internet source. Receivers are typically much more complex than transmitters. These high-speed receivers often receive data at rates of over 6 Mbps.

ADSL equipment can be subject to cross-talk noise from other subscriber lines situated adjacent to subscriber line 12. For example, subscriber lines are often provided in a closely contained bundle. The close containment can cause cross-talk from other subscriber lines to be placed on subscriber line 12. Modem 14 must compensate for cross-talk noise.

U.S. application Ser. No. 08/943,484, entitled, "Splitter-less Digital Subscriber Line Communication system," filed on Oct. 3, 1997, by Henderson, et al. describes a digital subscriber line (DSL) communication system which does not require the use of a splitter in the residence. The splitterless communication system allows a DSL modem to be connected directly to the subscriber line similar to the use of a conventional analog modem. The DSL modem used in the splitterless communication system is less expensive and does not utilize a considerably expensive high-speed receiver which operates at data rates over 2 Mbps.

As mentioned above, however, the presence of transistor and diode circuits in telephones can add non-linear distortion and cause hard clipping of ADSL signals. Non-linear components can also demodulate ADSL signals to cause a hiss in the audio range. The demodulation, distortion, and hard clipping which in conventional ADSL systems is shielded to a large degree by band splitter 20 can affect splitterless ADSL systems much more severely, since three is no band splitter at the user's residence.

Thus, there is a need for a power cutback level in splitterless DSL systems that achieves acceptable levels of noise reduction. Further, there is a need for reducing power as much as possible while preserving the signal to noise ratio at an acceptable level. Further still, there is a need to counter the demodulation effects of non-linear telephone devices on the telephone line.

SUMMARY OF THE INVENTION

One embodiment of the invention relates to a splitterless digital subscriber line modem adapted to be coupled to a subscriber line including a sending end and a receiving end, the modem being capable of simultaneous access to the subscriber line with other telephone equipment operating in a frequency band below four kilohertz. The modem includes a data terminal and a control circuit. The data terminal couples the modem to the subscriber line. The control circuit is coupled to the data terminal and receives and transmits signals to and from the data terminal. The control circuit utilizes line coding techniques to measure signal and noise at the receiving end and adjusts amplitude of the signal at the sending end in response to the signal and the noise whereby power of the signal is optimized.

Another embodiment of the invention relates to a communication system for use with a subscriber line. The communication system includes a user splitterless digital subscriber line modem, a splitter, and an office digital subscriber line modem. The user splitterless digital subscriber line modem is located at a office site and is coupled directly to the subscriber line. The modem receives downstream signals from the subscriber line and transmits upstream signals to the subscriber line. The office digital subscriber line modem utilizes line coding techniques to measure signal and noise at the office site and transmits control signals to the user splitterless digital subscriber line modem allowing it to adjust amplitude of the signal in response to the signal and the noise whereby power of the signal is optimized. The splitter is located remote from the user site and has a signal terminal, a lower frequency path terminal, and a higher-frequency path terminal. The signal terminal is coupled to the subscriber line. The lower frequency path terminal is coupled to a switched telephone network. The office digital subscriber line modem is coupled to the higher frequency path terminal. The office digital subscriber transmits the down stream signals to the subscriber line to the splitter and receives the upstream signals from the subscriber line through the splitter.

Another embodiment of the invention relates to a method of optimizing total transmitted power over a subscriber line including a sending end and receiving end in a splitterless asynchronous digital subscriber line (ADSL) system. The method includes utilizing line coding techniques to measure signal and noise at the receiving end and adjusting signal amplitude at the sending end based on signal and noise measured at the receiving end.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENTS

Figure 2:
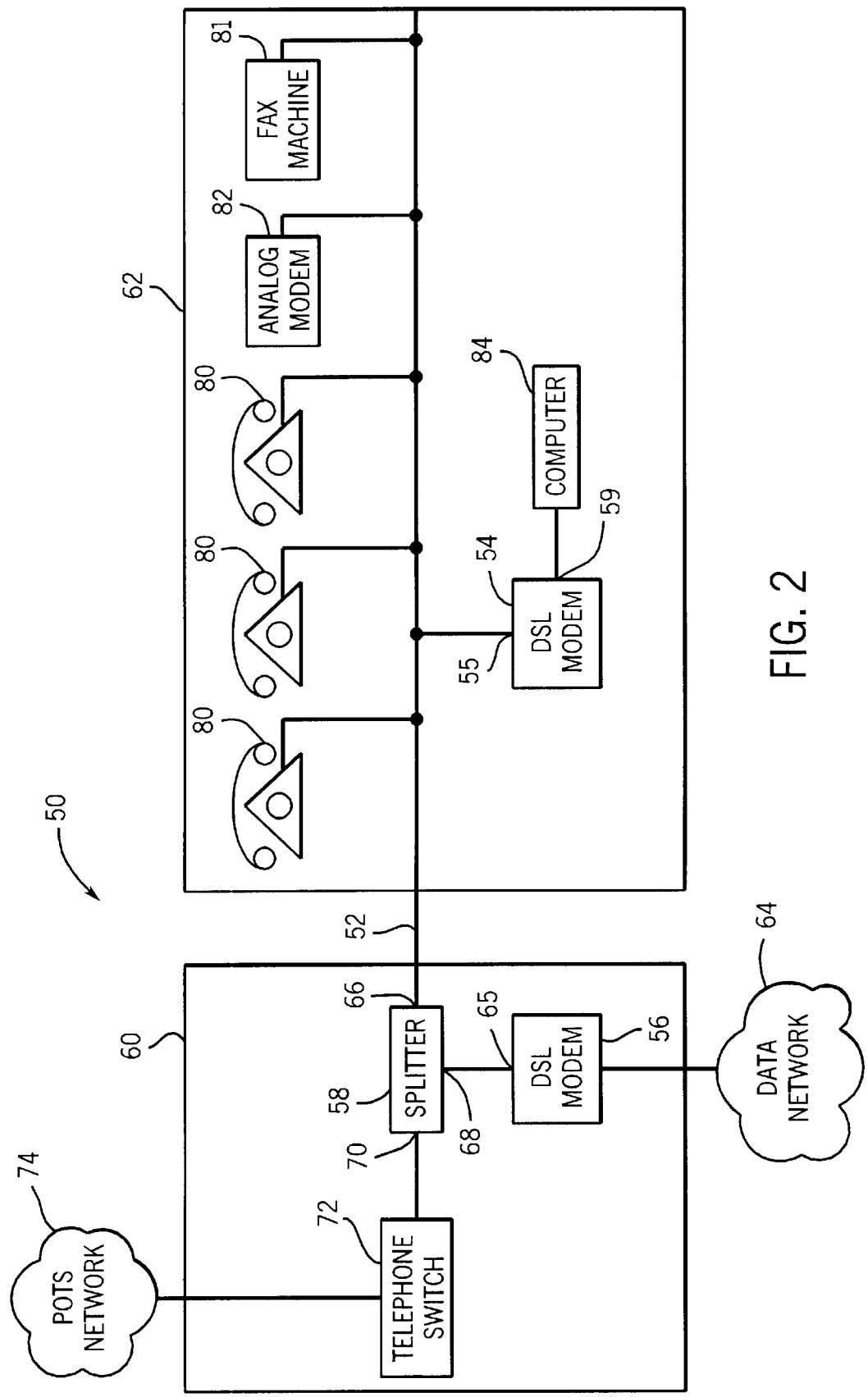
FIG. 2 is a schematic block diagram of a communication system in accordance with an exemplary embodiment of the present invention, the communication system includes a DSL modem in accordance with another exemplary embodiment of the present invention.

With reference to FIG. 2, a DSL communication system 50 includes a copper twisted pair subscriber line 52, a customer or residential DSL modem 54, a central office DSL modem 56, and a band splitter 58. Subscriber line 52 is a local loop, such as, a twisted pair of American wire gauge (AWG) 24 or 26 copper wires, which connects a central office 60 and a residence 62. Residence 62 can also be an office, building, or other facility. Similarly, central office 60 can be any facility associated with a provider of telephone services.

DSL modem 56 is coupled to a data network 64. Splitter 58 has a signal input 66 coupled to subscriber line 52, a higher-frequency output 68 coupled to DSL modem 56, and a lower-frequency output 70 coupled to a telephone switch 72. Telephone switch 72 is coupled to a POTS network 74. DSL modem 56, splitter 58, and telephone switch 72 are preferably located in central office 60. Alternatively, splitter 58 could be included as part of DSL modem 56 (e.g., DSL modem 56 is provided as an in-line device between subscriber line 52 and switch 72).

In residence 62, one or more telephones 80, analog facsimile machine 81, and analog modem 82 can be coupled directly to subscriber line 52 as is well known in the art. Telephone 80 can be any conventional communication devices, including answering machines, which can be coupled to subscriber line 52 for providing various POTS functions.

DSL modem 54 is coupled directly to subscriber line 52 at a data terminal, input/output or subscriber line access 55. DSL modem 54 is also coupled to a computer 84. Alternatively, DSL modem 54 could be coupled to other devices (not shown), such as, a network, server, or other communication or computing device.

Figure 1:
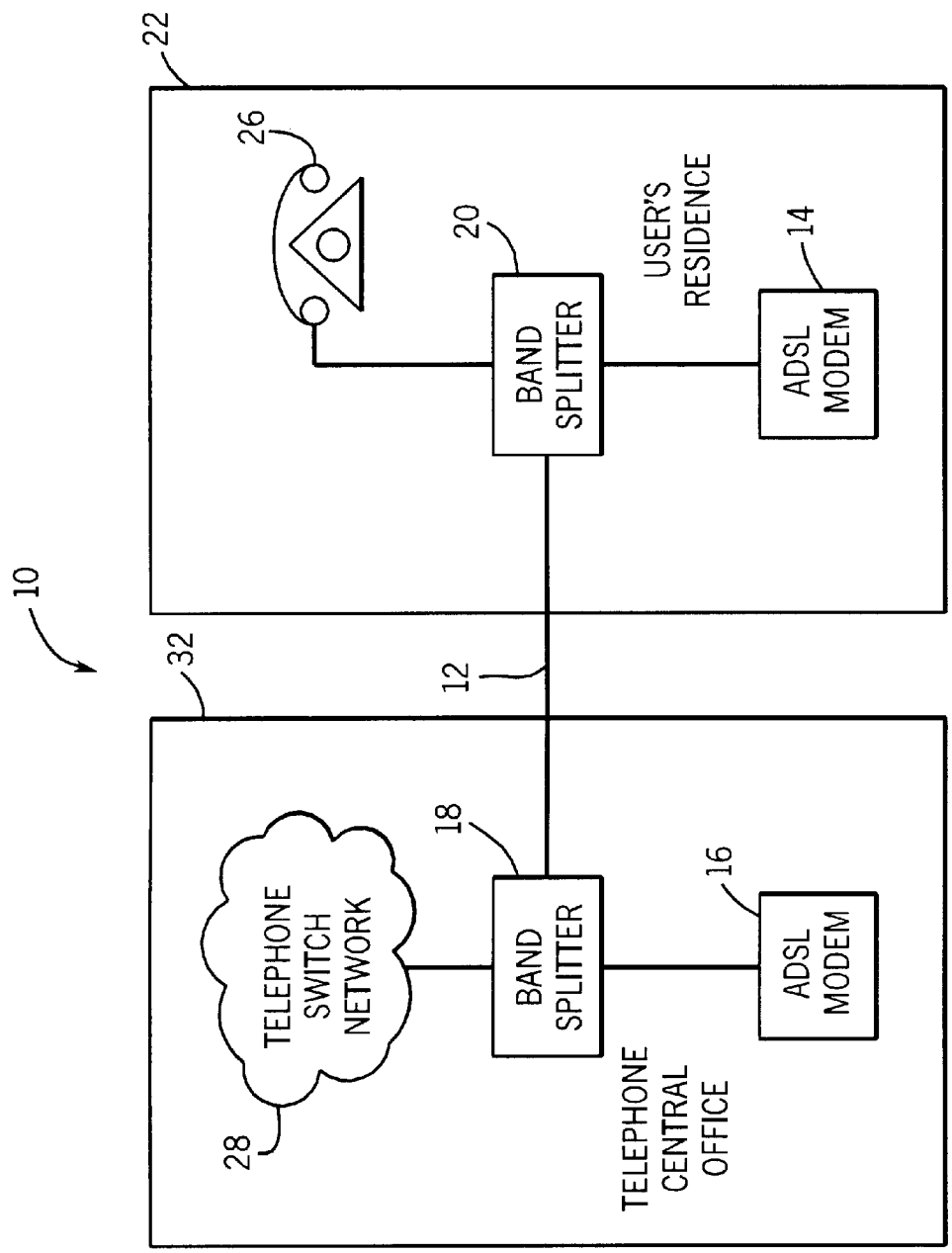
FIG. 1 is a schematic block diagram of a prior art ADSL communication system.

Unlike conventional ADSL or DSL communication systems, such as, system 10 described with reference to FIG. 1, DSL modem 54 does not utilize a splitter between modem 54 and subscriber line 52 and between telephones 80 and subscriber line 52. DSL modem 54 advantageously utilizes digital signal processing techniques to adapt to varying subscriber line characteristics due to analog equipment, such as, telephones 80, machine 81, and modem 82, thereby eliminating the need for a splitter in residence 62. DSL modem 54 can operate concurrently with any of telephones 80, machine 81, and analog modem 82.

DSL modem 54 preferably includes subscriber line access 55 which is part of a standard connector, such as, an RJ11 walljack, and is coupled to subscriber line 52 similarly to conventional telephones 80 and analog modems 82. Access 55 is preferably a two-wire terminal.

Modem 54 can be provided as an internal device in computer 84, such as, on a PCI card, or as an external device. Preferably, modem 54 is an internal device so that high speed communications between modem 54 and computer 84 are not slowed by serial ports associated with computer 84. As an external device, modem 54 could be coupled through a printer port or a universal serial bus (USB) to computer 84.

Modem 54 preferably adjusts the amplitude of the signal transmitted at access 55 in response to signal-to-noise ratios at access 65 associated with modem 56. The amplitude can be advantageously adjusted by modem 54 on a tone-by-tone basis to optimize the reception of the signal at access 65 while minimizing the potential for nonlinear interference from telephone 80, fax machine 81, and/or analog modem 82. The same adjustment can take place in the downstream direction, that is, modem 56 can preferably adjust the amplitude of the signal transmitted at access 65 in response to signal-to-noise ratios at access 55 associated with modem 54. Preferably, cutbacks are possible up to 30 dB in the upstream and downstream directions. Some systems proposed to the International Telecommunications Union (ITU) attempt to solve the problem of high noise level by adjusting total transmitted power (i.e. power cutback) by only 6 to 9 dB in the upstream direction, and up to 12 dB in the downstream direction. However, these proposed systems do not achieve the necessary level of noise reduction.

The power cutback approach requires changes in the start of negotiation. Specifically, both the receive end and sending end of the communication line must indicate to each other how much power cutback is possible and how many data bits would be able to be sent per symbol. In one embodiment where DMT line coding techniques are used, the bits and gains determination algorithm is altered to reflect the negotiation between the receive end and sending end.

Figure 3:
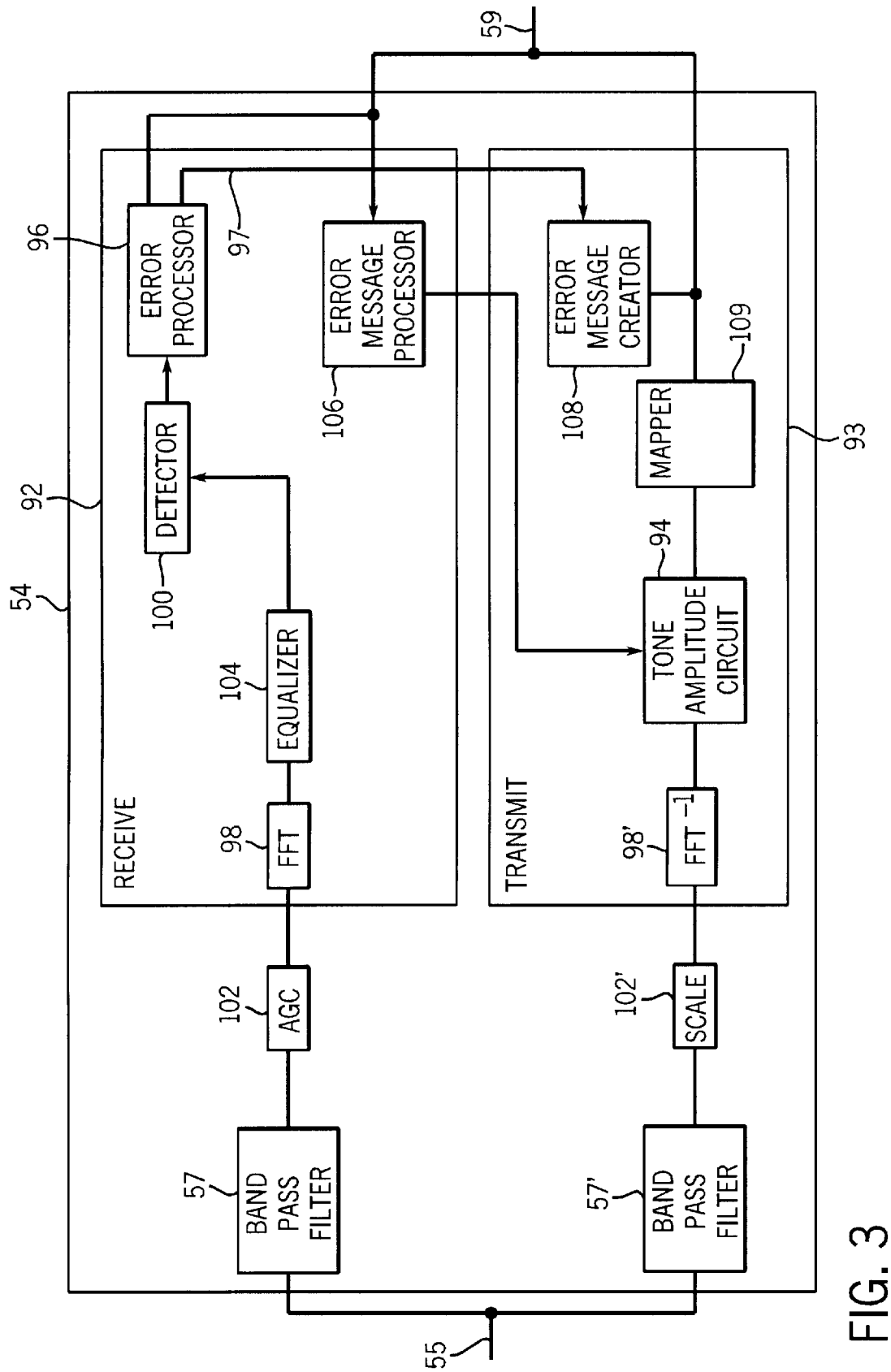
FIG. 3 is a more detailed schematic block diagram of the DSL modem illustrated in FIG. 2, the DSL modem includes a control circuit in accordance with yet another exemplary embodiment of the present invention.

With reference to FIG. 3, modem 54 includes a band-pass filter 57 coupled between access 55 which is coupled to subscriber line 52. Modem 54 also includes a band-pass filter 57' coupled between access 55 which is coupled to subscriber line 52. Band-pass filters 57 and 57' preferably have a threshold frequency above 4 kHz and beneath the lowest band carrier edge for the DSL signals to prevent POTS signal from entering modem 54. Filters 57 and 57' can be passive filters with a threshold frequency of 10 kHz. As a person of ordinary skill in the art would understand, although multiple blocks are shown in FIG. 3 for band-pass filters 57 and 57', these functional blocks can be implemented with single components.

In one exemplary embodiment, modem 54 includes a receive control circuit 92 and a transmit control circuit 93 which operate with the discrete multitone (DMT) line coding technique. Other line coding techniques, such as, carrier less amplitude and phase (CAP) techniques, may be used.

In the embodiment using DMT line coding, receive control circuit 92 includes an error processor 96, a fast fourier transform (FFT) circuit 98, a detector 100, a frequency domain equalizer 104, and an error message processor 106. Additionally, an automatic gain control circuit (AGC) 102 is disposed between band-pass filter 57 and FFT circuit 98. Transmit control circuit 93 includes an inverse fast fourier transform (FFT) circuit 98', a tone amplitude module or circuit 94, and an error message creator 108. Additionally, a transmit gain scaler circuit 102' is disposed between band-pass filter 57' and inverse FFT circuit 98'.

Circuits 102 and 102' can be analog circuits. Alternatively, circuits 102 and 102' can be digital circuits located in receive control circuit 92 or transmit control circuit 93. Circuits 102 and 102' can also be hybrid analog and digital circuits. Additionally, as a person of ordinary skill in the art would understand, although multiple blocks are shown in FIG. 3 for AGC circuits 102 and 102', these functional blocks can be implemented with single components.

In the receive control circuit 92, FFT circuit 98 is disposed between circuit 102 and equalizer 104 and is implemented by a digital signal processor (DSP) (not shown) running a software program. FFT circuit 98 or AGC circuit 102 converts the signal received from line 52 from an analog to a digital representation. FFT circuit 98 converts the digital signal from the time domain to the frequency domain and sends the converted digital, frequency domain signal to equalizer 104.

Frequency domain equalizer 104 is disposed between FFT circuit 98 and detector 100 and error message processor 106. An output line from error processor 96 leads to computer 84 via line 59 and can also lead other components within modem 54. Equalizer 104 is an adaptive compensation circuit for counteracting distortions on line 52. Equalizer 104 can be converged (e.g., tuned) so the constellation associated with the QAM signals are appropriately situated for decoding. Alternatively, equalizer 104 can be any device, digital or analog, for reducing frequency or phase distortion, or both, on subscriber line 52 by the introduction of filtering to compensate for the difference in attenuation or the delay, or both, at various frequencies in the transmission and reception spectrums.

Detector 100 is disposed between frequency domain equalizer 104 and error processor 96. Detector 100 generates an output which includes error signals. In another possible embodiment, detector 100 is a slicer.

Error processor 96 monitors signals from detector 100 to determine and provide a signal and noise signal on line 97. The signal and noise signal on line 97 is received by error message creator 108 in transmit control circuit 93 where an error message is created to be sent along line 52.

Error message processor 106 processes error messages sent along line 52 from modem 56 (FIG. 2). Error processor 106 sends a signal to tone amplitude circuit 94 in transmit control circuit 93 indicating the need to adjust the amplitude of individual tones (or frequencies) and/or the amplitude of the entire signal on line 52.

Tone amplitude circuit 94 adjusts the amplitude of individual tones (or frequencies) and/or the amplitude of the entire signal on line 52. The adjustments in amplitude occur in response to signals from error message processor 106. As such, tone amplitude circuit 94 optimizes signal power on line 52. Advantageously, the amplitude of the signal received at access 55 on line 52 can be adjusted on a tone-by-tone basis. Preferably, the adjustments in amplitude result in power cutbacks of up to 30 dB in both the upstream and downstream directions.

In the transmit control circuit 93, inverse FFT circuit 98' is disposed between circuit 102' and tone amplitude circuit 94 and is implemented by a digital signal processor (DSP) running a software program. A mapper circuit 109 is disposed between line 59 and circuit 104. Inverse FFT circuit 98' converts the signal received from tone amplitude circuit 94 from the frequency domain to the time domain and from a digital to an analog representation. The inverse FFT circuit 98' sends the converted analog, time domain signal to circuit 102'.

Figure 4:
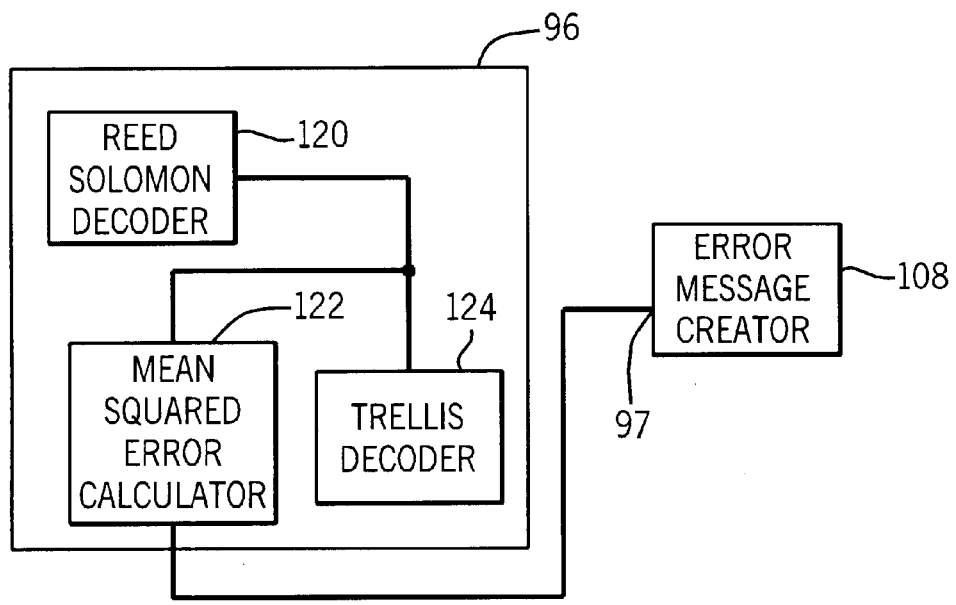
FIG. 4 is a more detailed schematic block diagram of the control circuit illustrated in FIG. 3.

With reference to FIG. 4, error processor 96 may include a Reed-Solomon decoder 120, a mean squared error calculator 122, and a Trellis decoder 124. Reed-Solomon decoder 120 analyzes frames of data provided from decoder 124 and determines if a frame error occurs and if errors are occurring in the frame. Reed-Solomon decoder 120 can correct errors is well known in the art. Calculator 122 provides error message creator 108 an indication of the signal-to-noise ratio through line 97. Alternatively, calculator 122 can be replaced by other systems which can provide an indication of signal-to-noise ratios. In another alternative, creator 108 can respond to other error signals, such as signals from decoder 120 or decoder 124.

Figure 5:
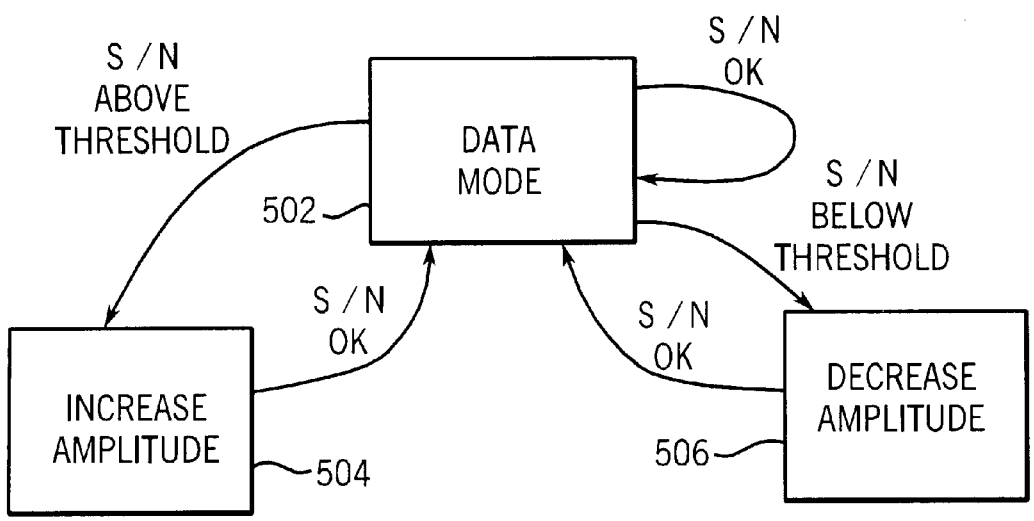
FIG. 5 is a state diagram showing an example of the operation of DSL modem illustrated in FIG. 3.

With reference to FIG. 5, operation of modem 54 is described with reference to FIGS. 2–5. FIG. 5 is a state diagram showing signal power cutback operations for modem 54. Modem 54 preferably operates at reduced transmitted power levels to counter the demodulation effects of non-linear components on the telephone line (e.g., line 52). Such reduced power levels are the result of lower amplitudes of the total signal and lower amplitudes of individual tones (or frequencies). According to this technique, a line probing sequence is performed to measure both the signal and noise at the receiving end, followed by a hand-shaking sequence in which that information is conveyed back to the transmitting end.

In FIG. 5, modem 54 (FIG. 2) operates in a data mode 502 when data is communicated across subscriber line 52. As data is communicated, signal-to-noise ratio (S/N) signals from error processor 96 are consistently checked. If the S/N signals are within an acceptable level, modem 54 is maintained in data mode state 502. However, if the S/N signals are above a certain threshold, modem 54 enters an increase amplitude state 504 in response to an error message from modem 56. In state 504, modem 54 increases the amplitude of individual tones (or frequencies) and/or the amplitude of the entire signal. The increase in amplitude results in an increased signal power. State 504 is maintained until the S/N signals are within the determined threshold. Once the S/N signals are within the determined threshold as determined by modem 56, modem 54 returns to data mode 502.

If the S/N signals are below a certain threshold, modem 54 enters a decrease amplitude state 506 in response to an error message from modem 56. In state 506, modem 54 decreases the amplitude of individual tones (or frequencies) and/or the amplitude of the entire signal. The decrease in amplitude results in a decreased signal power. State 506 is maintained until the S/N signals are within the determined threshold. Once the S/N signals are within the determined threshold by modem 56, modem 54 returns to data mode 502.

The advantageous architecture of modem 54 can be utilized in modem 56. The operation of modem 56 can also be similar to modem 54 wherein modem 56 responds to error messages from modem 54 to increase or decrease the amplitude of the downstream signal on line 52. Modem 56 can also create error messages similar to modem 54. Alternatively, modem 56 can include different types of circuitry for generating and responding to error messages.

Thus, modems 54 and 56 cooperate to optimize the amplitude of downstream and upstream signals on line 52. The modem on the sending end of line 52 adjusts the amplitude of the signal in response to an error message or control signal from the modem on the receiving end. The error message can be generated in response to signal-to-noise ratios on the receiving end. Either modem 54 or 56 can be on the receiving end or the transmitting end.

While the embodiments illustrated in the FIGs. and described above are presently preferred, it should be understood that these embodiments are offered by way of example only. Other embodiments may include, for example, control circuits capable of carrier less amplitude and phase (CAP) line coding techniques. The invention is not limited to a particular embodiment, but extends to various modifications that nevertheless fall within the scope of the appended claims.

What is claimed is:

1. A splitterless digital subscriber line modem adapted to be coupled to a subscriber line, the modem being capable of simultaneous access to the subscriber line with other telephone equipment operating in a frequency band below four kilohertz, the modem comprising:

a data terminal for coupling to the subscriber line; and a control circuit coupled to the data terminal, the control circuit receiving and transmitting signals to and from the data terminal, the control circuit utilizing line coding techniques to measure signal and noise at a receiving end to generate a first error message for transmission at the transmitting end and adjusting amplitude of the signal at a transmitting end in response to a second error message received at the receiving end whereby power of the transmitted signals is optimized.

2. The digital subscriber line modem of claim 1, further comprising:

a high pass filter coupled between the data terminal and the control circuit, the high pass filter attenuating lower frequency signals at the data terminal.

3. The digital subscriber line modem of claim 2, wherein the high pass filter attenuates the lower frequency signals having a frequency below 46 KHz.

4. The digital subscriber line modem of claim 1, wherein the subscriber line as a twisted pair copper line.

5. The digital subscriber line modem of claim 1, wherein the control circuit transmits and receives the data in a data mode, the control circuit transmitting and receiving the data at data rates, the control circuit adjusting the data rates in response to bearing conditions due to the other telephone equipment on the subscriber line.

6. The digital subscriber line modem of claim 5, wherein the varying conditions include changes in the impedance of a subscriber line due to hooking or unhooking of the other telephone equipment.

7. The digital subscriber line modem of claim 1, wherein line coding techniques include discrete multi-tone (DMT).

8. The digital subscriber line modem of claim 1, wherein the control circuit adjusts signal amplitude on a per tone basis.

9. A communication system for use with a subscriber line, the communication system comprising:

an office digital subscriber line modem located at a site central and coupled to the subscriber line; and a user splitterless digital subscriber line modem, located at a user site, the user splitterless digital subscriber line modem being coupled directly to the subscriber line and receiving downstream signals from the subscriber line and transmitting upstream signals to the subscriber line, the office digital subscriber line modem utilizing line coding techniques to measure signal and noise at the central site and adjusting amplitude of the downstream signals in response to an error control signal from the user splitterless digital subscriber line modem, the office digital subscriber line modem generating the error control signal in response to the signal and noise.

10. The communication system of claim 9, wherein adjusting amplitude of the signal is done on a per tone basis.

11. The communication system of claim 9, wherein the upstream signals and downstream signals are quadrature amplitude modulated signals.

12. The communication system of claim 9, wherein the line coding techniques include discrete multi-tone (DMT).

13. The communication system of claim 9, wherein the user splitterless digital subscriber line modem adjusts data rates of the upstream and downstream signals in response to varying conditions on the subscriber line.

14. The communication system of claim 13, wherein the varying conditions include changes in the impedance of the subscriber line due to hooking or unhooking other telephone equipment coupled to the subscriber line.

15. A method of optimizing total transmitted power over a subscriber line including a sending end and receiving end in a splitterless asynchronous digital subscriber line (ADSL) system, the method comprising:

utilizing line coding techniques to measure signal and noise at the receiving end; and adjusting signal amplitude at the transmitting end based on signal and noise measured at the receiving end.

16. The method of claim 15, wherein adjusting signal amplitude includes adjusting amplitude of individual tones of the signal.

17. The method of claim 15, wherein line coding techniques include discrete multi-tone (DMT).

18. The method of claim 15, wherein adjusting amplitude of the signal is done by changing the bits and gains determination algorithm.

19. The method of claim 15, wherein adjusting amplitude of the signal is done for the entire signal.

20. The method of claim 15, wherein line coding techniques include carrierless amplitude and phase (CAP).

* * * * *